United States Patent [19]

Gorges

[11] Patent Number: 4,696,583
[45] Date of Patent: Sep. 29, 1987

[54] BALL SUPPORT ASSEMBLY

[75] Inventor: Frederick J. Gorges, Bellevue, Wash.

[73] Assignee: The Boeing Company, Seattle, Wash.

[21] Appl. No.: 922,703

[22] Filed: Oct. 24, 1986

Related U.S. Application Data

[63] Continuation-in-part of Ser. No. 829,404, Feb. 11, 1986, abandoned, which is a continuation of Ser. No. 614,277, May 25, 1984, abandoned.

[51] Int. Cl.$^4$ ............... F16C 29/04; B60B 33/08; B65G 13/00
[52] U.S. Cl. ........................................ 384/49; 16/26; 193/35 MD
[58] Field of Search ............... 384/49, 490, 491, 610; 193/35 MD, 35 SS, 35 A, 35 B, 35 C; 16/24-27, 18 R; 280/79.1 R; 414/676, 535

[56] References Cited

U.S. PATENT DOCUMENTS

| | | | |
|---|---|---|---|
| 1,490,649 | 4/1924 | Vanderbeek | 403/290 |
| 1,963,956 | 6/1934 | Craig | 193/35 MD X |
| 2,931,477 | 4/1960 | Metzgar | 308/6 R |
| 2,972,162 | 2/1961 | Townsend | 16/26 |
| 3,096,536 | 7/1963 | Rabelos | 16/24 |
| 3,132,904 | 5/1964 | Wakamatsu et al. | 16/26 X |
| 3,466,697 | 9/1969 | Cain | 16/26 |
| 3,478,382 | 11/1969 | Nosenzo | 16/24 X |
| 3,557,401 | 1/1971 | Jenkins | 16/26 |
| 3,739,894 | 6/1973 | Hinman | 193/35 MD |
| 3,865,437 | 2/1975 | Crosby | 403/289 X |
| 4,285,550 | 8/1981 | Blackburn et al. | 16/25 X |
| 4,382,637 | 5/1983 | Blackburn et al. | 308/6 R |
| 4,553,795 | 11/1985 | Takagi | 308/6 R |

FOREIGN PATENT DOCUMENTS

| | | | |
|---|---|---|---|
| 1151466 | 6/1963 | Fed. Rep. of Germany | 308/6 R |
| 1150429 | 8/1957 | France | 193/35 MD |
| 1297185 | 5/1962 | France | 193/35 MD |
| 1266501 | 3/1972 | United Kingdom | 16/24 |
| 609679 | 6/1978 | U.S.S.R. | 193/35 MD |

Primary Examiner—Stuart S. Levy
Assistant Examiner—Thomas R. Hannon
Attorney, Agent, or Firm—Hughes & Cassidy

[57] ABSTRACT

A mounting member having an upper peripheral side wall to receive a ball member, and a lower connecting portion to be placed in locking engagement through a bottom opening in a base member. The side wall is positioned within a base support member for limited up and down movement; a plurality of spring-like washers are positioned between the mounting member and the base support member to urge the mounting member and the ball member which it supports to an upper support position.

25 Claims, 7 Drawing Figures

BALL SUPPORT ASSEMBLY

CROSS-REFERENCE TO RELATED APPLICATION(S)

This is a continuation-in-part application of U.S. patent application Ser. No. 829,404 filed Feb. 11, 1986, entitled "BALL SUPPORT ASSEMBLY", which in turn is a continuation of U.S. patent application Ser. No. 614,277 filed May 25, 1984 entitled "BALL SUPPORT ASSEMBLY" both now abandoned.

BACKGROUND OF THE INVENTION

1. Technical Field

The present invention relates to ball support assemblies, such as those which are provided in floors of cargo carriers to provide low friction rolling support for cargo.

2. Background Art

There are in the prior art cargo handling systems where the support surface for the cargo has a plurality of ball support units positioned across the floor. The ball member of each such unit is rotatably mounted in a manner to provide a low friction support surface over which the cargo can roll. In some instances, the ball members are spring loaded in their respective units so as to provide for limited up and down movement of the ball members, so that the loads can be properly distributed over a number of ball units.

Such cargo handling systems have been used in connection with aircraft where fast and convenient cargo handling is required, and the cargo handling must be accomplished in a relatively limited space. While such cargo handling systems in the past have been used effectively, there is a continuing need to improve the design of these systems relative to cost, convenience of installation and repair, and overall effectiveness of operation.

There are a number of such ball support units which are shown in the patent literature, and these are discussed below.

U.S. Ser. No. 631,804, Manley, shows a ball caster, where there is a main support ball held in position by an open ring and supported at least partly by a second smaller ball member.

U.S. Pat. No. 1,963,956, Craig, illustrates a ball transfer unit for a cargo system, where a ball member is mounted on ball bearings, and there is a semi-circular lock spring to hold the unit in place.

U.S. Pat. No. 2,617,509, Britton, discloses a roller assembly where there is a cylindrically shaped roller mounted for rotation about a horizontal axis. The roller is urged by a lower compression spring to an upper position.

U.S. Pat. No. 2,972,162, Townsend, illustrates a system of load bearing balls where the smaller ball bearings that support the main support ball are mounted in an endless track.

U.S. Pat. No. 3,096,536, Rabelos, shows a ball caster unit where the ball support is mounted in a retainer housing and is urged by a compression spring outwardly to its support position.

U.S. Pat. No. 3,132,904, Wakamatsu et al, illustrates a device for rollably supporting a ball, where there is a particular arrangement of bearing members positioned at selected locations.

U.S. Pat. No. 3,466,697, Cain et al, shows a ball transfer or caster unit where there is a ball supported by a plurality of ball bearings, and held in place by a member having an inwardly extending retaining ring which fits over the ball. A compression spring urges the ball and the member on which it is mounted upwardly to its support position.

U.S. Pat. No. 3,478,382, Nosenzo, shows an arrangement for a ball transfer unit that is generally similar to the Cain et al patent noted above.

U.S. Pat. No. 3,557,401, Jenkins, shows a caster unit where the main ball is supported by a plurality of smaller ball bearings that are arranged in cages so that these can rotate in endless paths, thus preventing jamming.

U.S. Pat. No. 3,739,894, Hinman, shows a ball transfer unit where the main ball is supported by a plurality of smaller ball bearings. The support member has an upper in turned shoulder to hold the main ball in place. There is a compression spring which urges the ball upwardly toward its upper support position. There is a lower frusto-conical member to provide a bottom support for the main ball.

French Pat. No. 1,150,429 shows a ball support unit where there is a main support ball supported by a plurality of smaller bearings, with the bearings being retained in a cage.

French Pat. No. 1,297,185 shows another ball support unit where the main support ball is held by a plurality of smaller bearing members. The main support ball is retained in its position in the unit by a retaining member that extends around an upper portion of the ball.

It is an object of the present invention to provide a ball support assembly particularly adapted for use in cargo handling systems, with the assembly having a desirable balance of features, relative to simplicity and effectiveness of design, and also ease of installation and repair. Other desirable features of the present invention will become apparent in the detailed description that follows.

SUMMARY OF THE INVENTION

The ball support assembly of the present invention is adapted for use as part of a cargo handling system.

This assembly comprises first a base member having an upper base portion with an upper peripheral side wall defining an upper chamber. There is a lower base portion having a lower peripheral side wall defining a lower chamber, and also a bottom base portion.

A mounting member means is positioned within the base member for limited up and down movement between an upper normal position and a lower depressed position. This mounting member means comprises an upper ball retaining portion positioned in the upper chamber and having side wall means and bottom wall means defining a ball receiving recess. There is a lower connecting portion connected to and extending downwardly from the ball retaining portion. The connecting portion has an operative connection with the bottom base portion to limit upward movement of the mounting member means beyond the upper normal position and yet to permit downward movement to the depressed position.

The mounting member means and the base member have cooperating stop means to limit any downward movement of the mounting member means beyond the depressed position.

There is a ball member rotatably mounted in the recess and positioned to provide a rotatable ball support surface.

A compression spring means is positioned in the lower chamber of the lower base portion of the base member in a manner to press downwardly against the bottom base portion and upwardly against the mounting member means in a manner to resiliently hold the mounting member means at the upper normal position and yet to yieldingly resist downward movement of the mounting member means due to loads impressed on the ball support surface.

The assembly is characterized in that an upward force exerted by the spring means against the mounting member means is, with the mounting member means in the normal position, and with no substantial downward load being exerted on the ball member, resisted at least primarily by said connecting portion reacting substantially in tension between the bottom base portion and the upper ball retaining portion of the mounting member means.

In one embodiment, the connecting portion of the mounting member means comprises an outwardly extending flange means positioned to engage the bottom base portion. More specifically, the connecting portion of the mounting member means comprises a second connecting member which is removably connected in the mounting member means. The preferred configuration of the mounting member means in this embodiment comprises a downwardly extending threaded stud means, and the connecting member threadedly engages the stud means.

In this first embodiment, the mounting member means comprises two main mounting members which are adapted to be placed in side by side relationship to provide a main mounting member portion, and the connecting member in engaging such stud means functions to secure the main mounting members one to another to fixedly secure the main mounting members to one another.

Desirably, the mounting member means provides an upwardly facing bearing surface, and there is ball bearing means (desirably in the form of a plurality of ball bearings) positioned between the bearing surface and the ball member. The bearing surface comprises a first load bearing portion which is circularly curved about a center point in a manner that when a portion of the ball bearing means is positioned against the load bearing surface, that portion of the ball bearing means is in load bearing relationship with the ball member. The bearing surface also comprises a non-bearing surface portion positioned radially from said center point a further distance than said load bearing surface portion, so that when a second portion of said ball bearing means is adjacent the non-bearing surface portion, that second portion of the ball bearing means is not in load bearing relationship. More specifically, the non-bearing surface portion comprises an annular surface portion positioned radially outwardly of said load bearing surface portion. In a specific embodiment, there is also a second non-load bearing surface portion centrally located within the load bearing surface portion.

There is a downwardly extending through opening leading through a central location of the mounting member means to permit material to pass from said ball receiving recess through said downwardly extending opening.

In the preferred form, there is a bearing plate mounted within the mounting member to provide the bearing surface.

The assembly is adapted to be positioned in a floor member, and the base member is in a preferred embodiment provided with arm retaining means which project yieldingly outwardly to engage a lower retaining surface of said floor member. Desirably, the arm means comprises a pair of diametrically opposed arm members positioned on opposite sides of the base member, with the arm members being able to be deflected inwardly to a release position, and with the arm members being yieldingly urged to a radially outwardly extending floor engaging position. Preferably, the arm members are made integrally with said base member, and have lower root ends thereof integrally connected to the base member, and upper free ends which engage the floor member. In an alternative embodiment, these arm members are made as separate members. Also, in a specific configuration, the upper portions of the arm members are formed with notch means to receive a locating tool adapted to engage the notch means in a manner by which the arm members are moved to a release position.

The cooperating stop means comprises in a preferred form a first annular shoulder means presenting a downwardly facing annular stop surface positioned adjacent an outer peripheral wall of said mounting member means. There is a second shoulder means formed in the face member and presenting an outer annular upwardly facing stop surface adjacent a peripheral portion of said base member.

In another embodiment, the ball retaining portion comprises a unitary member which in turn comprises an expandable side wall which has an expanded position of sufficient size to receive the ball member in the recess in a retracted position where the ball is held in the recess. In a specific form, the peripheral wall of the base member fits sufficiently closely around the expandable side wall of the ball retaining portion so as to maintain the expandable side wall in its retracted position to retain the ball in the recess. Specifically, the expandable side wall is in this embodiment formed with vertically extending slot means, and the expandable side wall is formed with upper retaining means which reach inwardly to retain the ball member.

The connecting portion is positioned to fit into a bottom opening in the lower portion of the base member so as to be in locking engagement. In another embodiment, this connecting portion comprises a plurality of downwardly extending leg members having lower locking means, and the assembly further comprises in this embodiment a locking member to hold the legs outwardly in locking engagement in the bottom opening of the lower portion of the base member. The more specific form of the spring means is that it comprises a plurality of frusto-conical spring members positioned around the connecting portion and pressing from the bottom wall of the base member against the mounting member.

Other features of the present invention will become apparent from the following detailed description.

DESCRIPTION OF THE PREFERRED EMBODIMENTS

Figure 3:
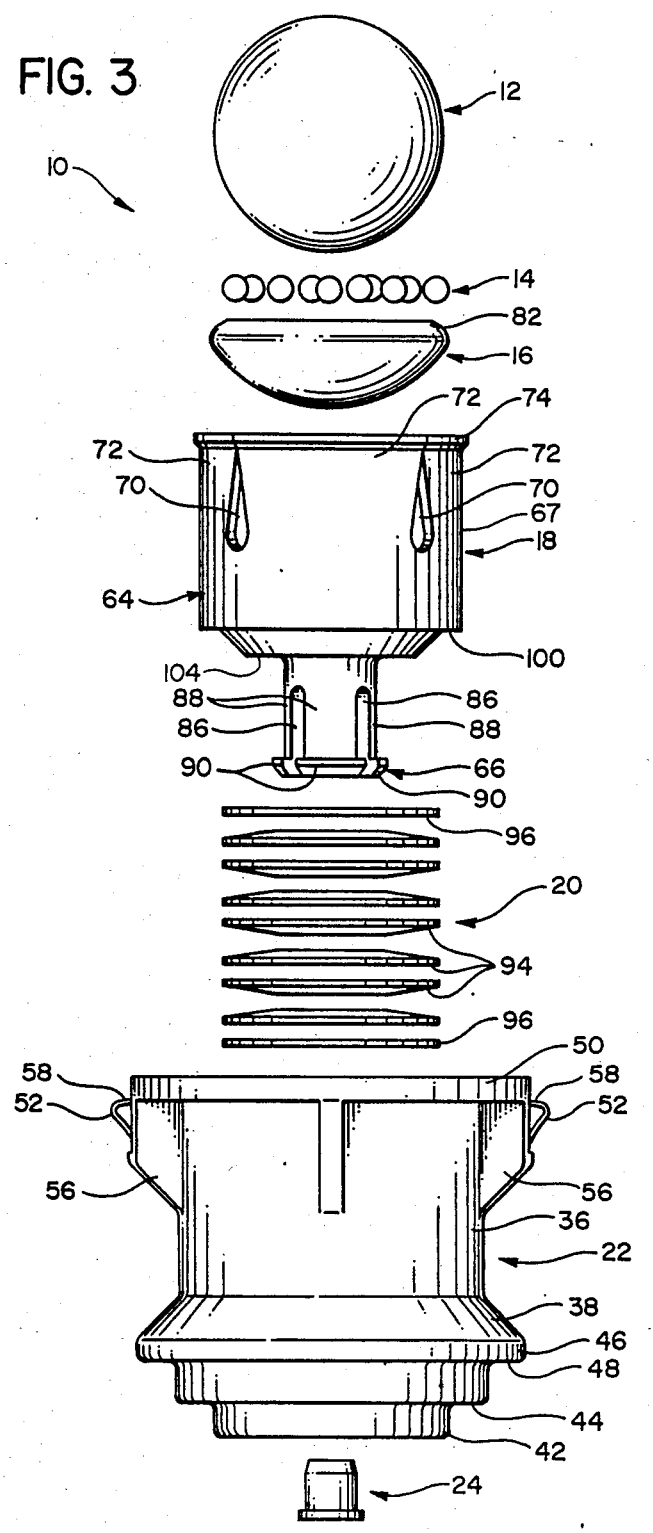
FIG. 3 is an exploded view showing the components of the ball support assembly in their disassembled position.
Figure 4:
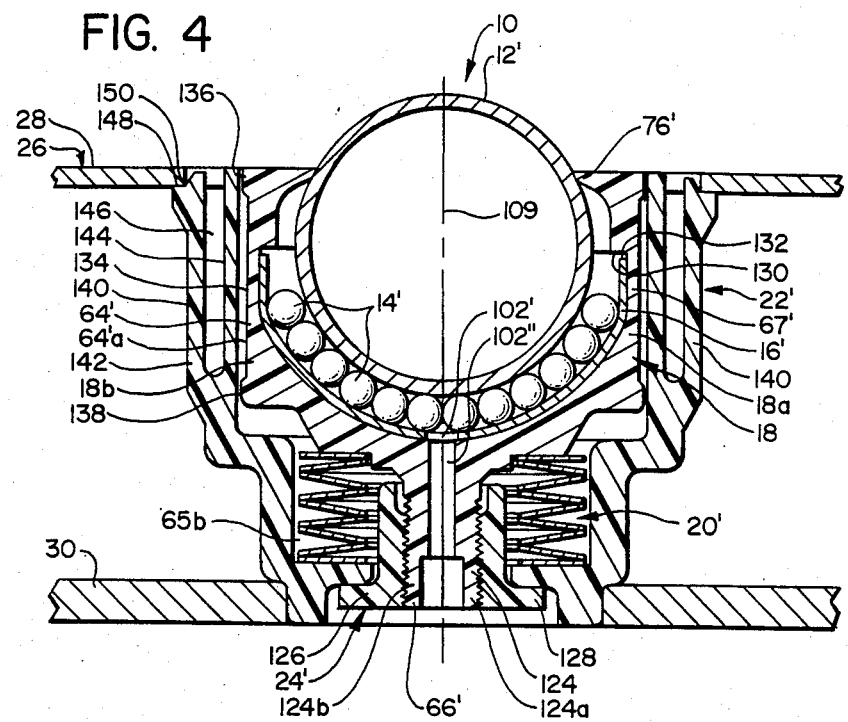
FIG. 4 is a view similar to FIG. 1, but showing a second embodiment of the present invention.
Figure 5:
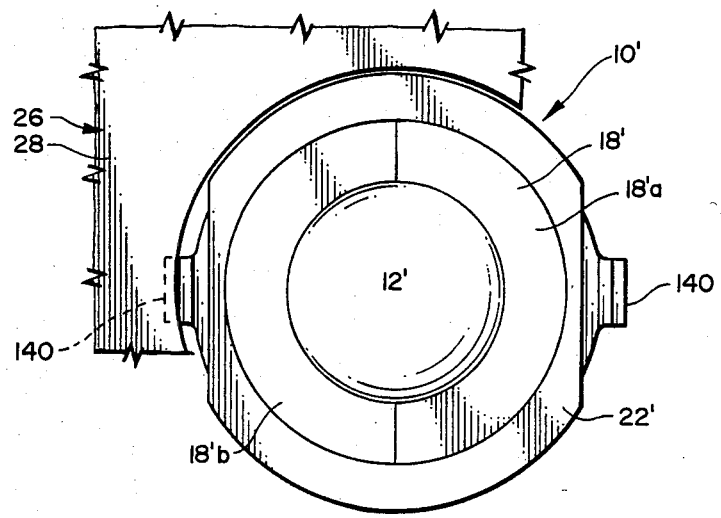
FIG. 5 is a top plan view of the ball support assembly shown in FIG. 1.

To describe the first embodiment of the present invention, reference is first made to FIG. 3, which shows the ball support assembly 10 of the first embodiment as comprising the following: a main ball member 12, a plurality of smaller ball bearings 14, a bearing plate 16, a mounting member 18, a spring assembly 20, a main base member 22, and a locking member 24.

Figure 1:
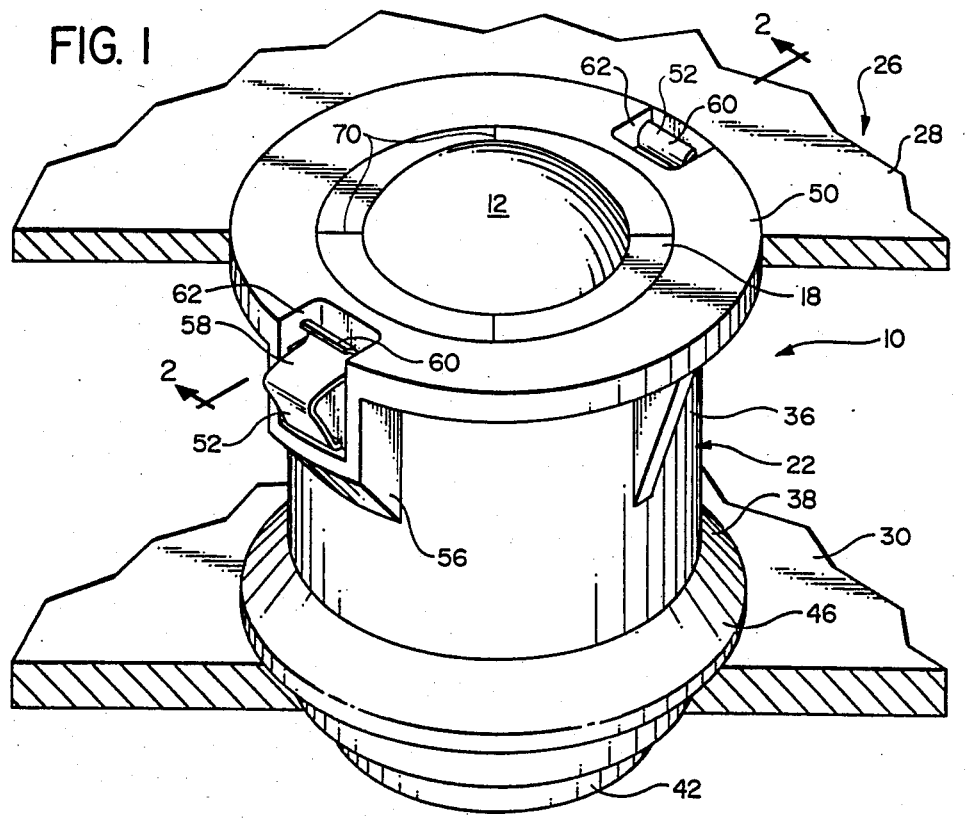
FIG. 1 is an isometric view of a ball support member of the present invention positioned at the floor of a cargo handling area, with the floor being shown in section.
Figure 2:
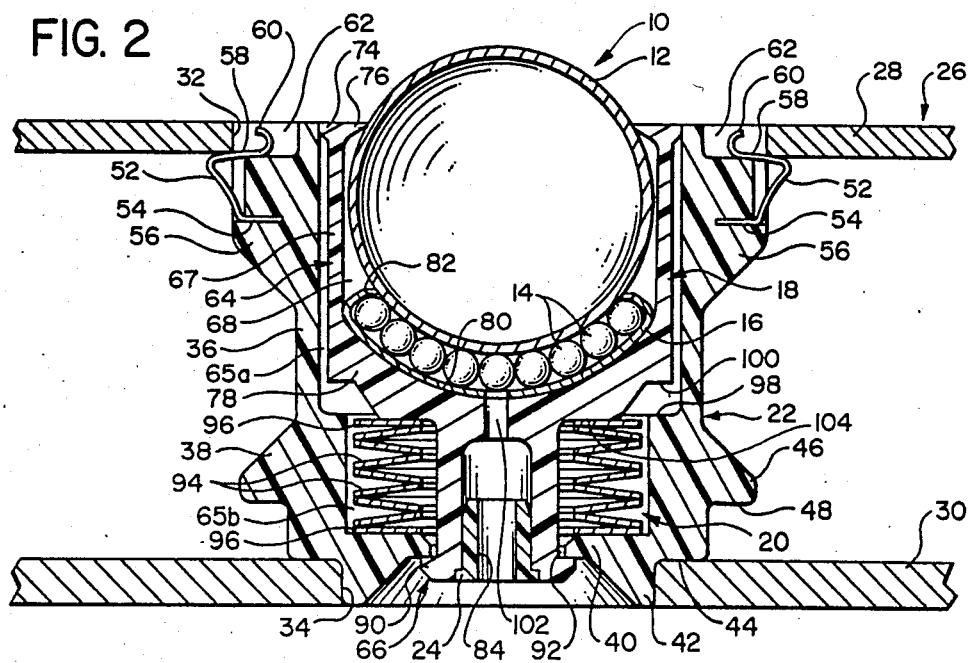
FIG. 2 is a sectional view taken along line 2—2 of FIG. 1, so as to show the ball support unit in vertical section.

These components 12–24 are shown in FIGS. 1 and 2 in their assembled position to form the ball support assembly 10 that is in turn mounted in the floor 26 of the cargo handling area. This floor 26 comprises upper and lower panels 28 and 30, respectively. These panels 28 and 30 can be interconnected by conventional means, such as an intermediate core of honeycomb, or possibly horizontally extending connection ribs. While only one ball assembly 10 is shown herein, it is to be understood that in a cargo handling system, a plurality of these ball assemblies would be positioned throughout the floor area over which cargo is to be moved. At each ball assembly location, the upper and lower panels are formed with aligned circular openings 32 and 34, respectively.

The base member 22 has a generally cylindrical configuration, and has an upper side wall portion 36, a lower side wall portion 38, and a bottom wall 40. The bottom wall 40 is formed with a downwardly extending circular lip 42 which fits into the lower panel opening 34 so as to properly position the base member 22, with the peripheral portion 44 of the bottom wall 40 bearing downwardly against the portion of the lower panel 30 that surrounds the opening 34. In some instances, the lower panel 30 may be formed with moderately larger openings 34, and for this reason the base member 22 is also provided with an annular support flange 46 that extends outwardly from the lower side wall portion 38 so as to form a downwardly facing shoulder 48. Thus, where the lower panel 30 is formed with the larger openings, the flange 46 provides the vertical support for the base member 22.

The upper end of the base member 22 has an outwardly extending flange 50 that fits closely within the upper opening 32 so as to form with the upper surface of the upper panel 28 a substantially continuous horizontal surface. The upper portion of the base member 22 is also provided with a pair of spring-like retaining elements 52 positioned on opposite sides of the member 22. Each element 52 comprises a lower mounting finger 54 that fits within a laterally extending slot formed in a protrusion 56 that is provided for each retaining element 52. The retaining element 52 extends upwardly from the finger 54 and is then formed with an inwardly extending shoulder portion 58 that ends in an upwardly and outwardly curved hook-like portion 60. The upper portion of the base member 22 is formed with shallow recesses or slots 62 to receive the hook-like portion 60 and shoulder portion 58 of its respective retaining element 52. In the installed position, the shoulder portion 58 extends beneath the edge portion of the upper panel 28 that surrounds the upper opening 32, thus preventing the ball assembly 10 from being moved upwardly from the floor 26. However, by gripping the two hook-like portions 60 and pressing them inwardly, the shoulder portions 58 of the retaining elements 52 are moved to a position within the periphery of the upper hole 32, so that the entire assembly 10 can be lifted out of the floor 26.

The aforementioned mounting member 18 is mounted within the base member 22 in a manner that the mounting member 18 has limited up and down movement. In terms of function, the mounting member 18 can be considered as having an upper ball retaining portion 64 fitting in an upper chamber portion 65a defined by the upper wall portion 36, and a lower connecting portion 66 which extends downwardly through a lower chamber portion 65b defined by the lower side wall portion 38, and by which the mounting member is secured to the base member 22.

The upper ball retaining portion 64 comprises a generally cylindrical side wall 67, that defines a ball receiving recess 68. The upper half of the wall 68 is formed with a plurality of evenly spaced vertical slots 70 that separate the upper portion of the side wall 67 into four expandable sections 72. The upper edge of the side wall 67 is formed with a circumferential flange 74 that has an inwardly extending circumferential lip 76 to retain the ball 12 in the recess 68. The outer edge of the flange 74 fits against the upper inner surface of the base member 22.

The ball retaining portion 64 also has a bottom wall 78 that has a circularly curved upwardly facing surface 80 to support the aforementioned bearing plate 16. The bearing plate 16 is curved to match the curvature of the upper surface 80 so that the entire lower surface of the bearing plate 16 bears against the upper surface 80, and allowing the two parts to be spin-welded at their interface. The bearing plate 16 is formed with a peripheral in-turned lip 82 so that the ball bearings 14 can be retained within the perimeter of the plate 16.

The connecting portion 66 is axially aligned with, and centered relative to, the ball retaining portion 64 and extends downwardly therefrom. This connecting portion 66 is cylindrically shaped, having a diameter substantially smaller than the ball retaining portion 64. Further, the connecting portion 66 has a lower cylindrical recess or socket 84, and its lower portion is formed with a plurality of downwardly extending open slots 86 so as to form the lower part of the connecting portion 66 into moderately flexible leg members 88.

The lower portion of each leg member 88 is formed with an outwardly extending retaining or locking foot 90. In the installed position of FIGS. 1 and 2, the connecting portion 66 extends downwardly through an opening 92 formed in the bottom wall 40 of the base member 22, with the four locking feet 90 reaching outwardly to grip the lower edge portion of the bottom wall 40 that surrounds the opening 92. The locking plug 24 is pushed upwardly into the socket 84, with the plug 24 being sized relative to the socket 84 so as to fit in a snug friction fit within the socket 84 and push the leg members 88 outwardly into locking engagement with the bottom wall 40.

The spring assembly 20 comprises a plurality of spring-like washers 94, each of which has a shallow frusto-conical configuration, with a center through opening to accommodate the connecting portion 66 of the mounting member 18. The top and bottom washers 96 can be made as flat washers to provide a proper bearing surface to press against the bottom wall 78 of the mounting member 18 and the bottom wall 40 of the base member 22, respectively. By increasing or decreasing the number of washers 94, the force exerted by the spring assembly 20 can be changed.

To limit the downward movement of the mounting member 18, the lower side wall portion 38 of the base member 22 is formed with an inside diameter moderately smaller than that of the upper side wall portion 36, so as to form an upwardly facing peripheral shoulder or annular surface 98. The lower edge of the side wall 67 of the mounting member 18 is formed with a downwardly facing peripheral shoulder of annular surface 100. When the ball 12 is pushed downwardly with sufficient force to compress the spring assembly 20, the mounting member 18 will "bottom out" when the shoulders or surfaces 98 and 100 come into contact with one another.

The bearing plate 16 and the mounting member 18 are each formed with aligned through openings (both of which are designated 102) which lead into the socket 84. These openings 102 provide for drainage of any water or other liquid which might pass into the recess 68 defined by the ball retaining portion 64.

One of the significant features of the present invention is the manner in which the components 12-24 can be assembled and disassembled (possibly for repair or adjustment), and also the manner in which the assembly 10 can be placed in its operating position in the floor 26 and removed therefrom.

With regard to the manner of assembling the components 12-24, attention is first directed to FIG. 3. The bearing plate 16, with the ball bearings 14 being placed thereon, is inserted into the recess 68 of the mounting member 18. Then the main support ball 12 is pushed downwardly into the recess 68. The ball 12 is sized so that as it is moved downwardly into the recess 68, it spreads the expandable sections 72 of the ball retaining portion 64. After the widest portion of the ball 12 passes by the upper inwardly extending lip 76 of the expandable section 72, these sections 72 spring back into place so that the lip 76 extends to a location closely adjacent to the ball 12, moderately above the midsection of the ball 12.

With the ball 12, bearings 14 and plate 16 positioned within the recess 68 of the mounting member 18, the spring assembly 20 is moved upwardly over the lower connecting portion 66 of the mounting member 18. Then, these assembled components 12-20 are moved downwardly into the base member 22 so that the upper ball retaining portion 64 of the member 18 fits in the upper chamber portion 65a, and the connecting portion 64 extends into the lower chamber portion 65b. The legs 88 of the connecting portions 66 can be squeezed or bent inwardly by a suitable tool so that the locking feet 90 can pass through the bottom opening 92. Then the legs 88 are released so that the legs 88 spring outwardly, with the feet 90 locked beneath the lower surface of the bottom wall 40 at the location of the opening 92. Then, the plug member 24 is pushed upwardly into the socket 84 so as to be firmly wedged therein. This keeps the legs 88 pushed outwardly in the opening 92 so that the feet 90 are securely locked under the bottom wall 40 of the base member 22.

With the components 10-24 so assembled, the spring assembly 20 pushes from the bottom wall 40 against the bottom surface of the bottom wall 78 of the mounting member 18. However, the upward force of the spring is resisted by the feet 90 engaging the bottom wall 40 of the base member 22.

The assembly 10 is placed in the floor by gripping the two hook-like portions 60 of the retaining elements 54 and squeezing them inwardly. Then the assembly 10 is lowered through the floor panel 28 so that the outer edge of the bottom wall 40 rests against the bottom floor panel 30. As indicated previously, if the two panels 28 and 30 are positioned closer to one another, the bottom hole or opening 34 can be made moderately larger, with the flange 46 resting against the lower panel 30. When the assembly 10 is in place, as shown in FIGS. 1 and 2, the two hook-like members 60 are released, and the retaining elements 52 spring outwardly, so that the shoulder portions 58 thereof hold the assembly 10 in the position of FIGS. 1 and 2.

As indicated previously, in operation there are a number of ball assemblies 10 positioned at spaced locations along the floor 26. The ball member 12, along with the mounting member 18, the bearing plates 16 and the ball bearings 14, has an upper normal position at which there is no vertical loading on the ball member 12, or at least insufficient vertical loading to depress the ball 12. In this position, the spring assembly 20 bears against the bottom wall 40 of the base member 22 to press upwardly against an annular downwardly facing bearing surface 104 of the bottom wall 78, this bearing surface 104 being immediately adjacent and surrounding the upper portion of the leg members 88, and being positioned radially inwardly from the annular peripheral shoulder 100. Thus, it can be appreciated that the upward force exerted by the spring assembly 20 is reacted entirely in tension in the connecting member 66, which comprises the leg members 88. Further, the forces exerted by the spring assembly 20 are a downward force directed against the bottom wall 40 of the base member 22 and against the bottom wall 78 of the mounting member 18. The upper ball retaining portion 64 of the mounting member 18 and the upper side wall portion 36 of the base member 22 do not have any function in resisting the upward force exerted by the spring assembly 20. Rather, these vertical cylindrical wall members 67 and 36 primarily resist any side loads which might result, for example, from a crate or other item of cargo impacting the ball member 12 to exert a force having a lateral force component as well as a downward force component.

When a crate or other cargo item passes over the ball support assembly 10 so as to come into contact with the ball 12, the ball 12 can rotate freely to provide very low friction contact with the cargo item. If there is high localized loading on one of the ball assemblies 10, the force on the ball 12 may be sufficient to overcome the upward force exerted by the spring assembly 20. In that case, the spring assembly 20 becomes depressed, so that the spring assembly 20 provides an increased upward force. If the load force is sufficiently great to totally overcome the upward force exerted by the spring assembly 20, then the mounting member 18 will "bottom out" by the surface 100 contacting the surface 98. During the downward movement of the mounting member 18, the connecting portion 66 slides downwardly in the bottom opening 92 of the bottom wall 40 of the base member 22.

With regard to the manner in which the loads are transmitted through the assembly 12, in those situations where the ball 12 is in the position of FIG. 2 or partially depressed to some intermediate position, then the entire vertical loading is taken through the spring assembly 20 and transmitted into the bottom wall 40 of the base member 22, and thence into the lower floor panel 30. When the ball 12 and the mounting member 18 "bottom out" so that the surfaces 100 and 98 come into contact, then the additional load is exerted as a direct compression load through the lower side wall portion 38 directly in a downward direction to the edge portion of the bottom panel 30 that defines the lower opening 34.

Even when the mounting member 18 "bottoms out", the mounting member 18 still provides some degree of cushioning. The reason for this is that the stop shoulder 100 is located at the outer periphery of the mounting member side wall 67, and the downward force exerted by the ball member 12 is spread more evenly over the center portion of the bottom wall 78 of the mounting member 18. since the mounting member 18 is desirably made of a plastic material which yields moderately, there is some degree of cushioning in the bottom wall 78 of the mounting member 18 flexing moderately under loading conditions where the mounting member 18 "bottoms out".

To remove the assembly 10 from the floor 26, the two hook-like portions 60 are squeezed inwardly (desirably by a suitable tool), and the assembly 10 is lifted from the floor 26. The assembly 10 can then be disassembled by removing the locking plug 24 from the socket 84 defined by the connecting portion 66. Then the legs 78 can be squeezed inwardly so that the locking feet 90 can pass upwardly through the opening 92 in the bottom wall 40. The mounting member 18 is then lifted out of the chambers 65a and 65b, and the ball member 12 can easily be removed by spreading the upper expandable sections 72 of the ball retaining portion 64.

From the above description, it is apparent that the two main components of this assembly 10 (i.e. the base member 22 and the mounting member 18) can be made of injection molded plastic parts. Further, the entire assembly 10 is held in its assembled position without the need of additional fasteners such as screws or bolts, and without bonding components one to another.

The second embodiment of the present invention will now be described with reference to FIGS. 4 through 7. Components of the second embodiment which are similar to components of the first embodiment will be given like numeral designations, with a prime (') designation distinguishing those of the second embodiment. The support assembly 10' of the second embodiment has, as in the first embodiment, the seven main components. The main ball member 12', the ball bearings 14' and the spring assembly 20' are or may be substantially identical to the corresponding components of the first embodiment. The remaining four components, namely the bearing plate 16', the mounting member 18', the main base member 22 and the locking member 24' are structured somewhat differently from the corresponding components of the first embodiment.

Figure 6:
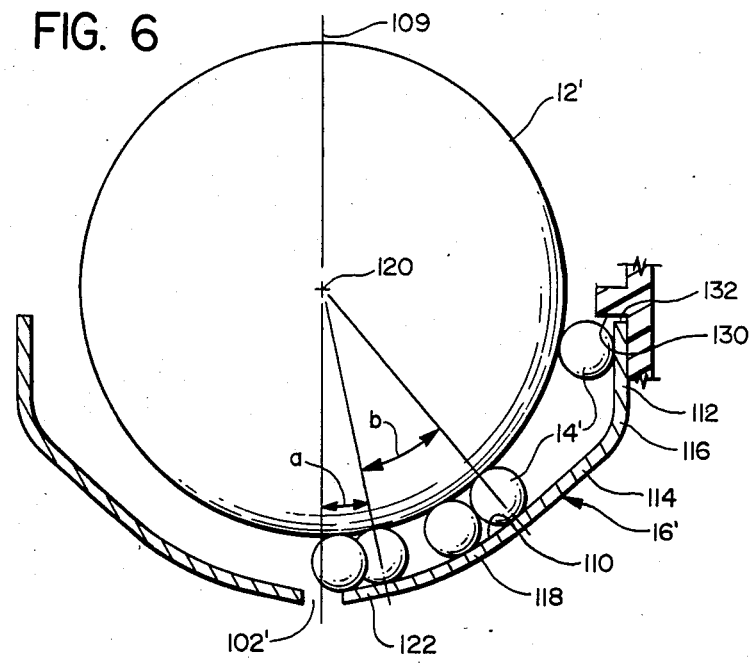
FIG. 6 is a sectional view of the bearing plate of the second embodiment, illustrating more specifically the contouring of its bearing surface.

With regard to the bearing plate 16', reference is made to FIG. 6. As in the first embodiment, the bearing plate 16' has a toroidal configuration with a vertical center axis 109. For purposes of analysis, the bearing plate 16' can be considered as having four annular surface portions which blend into each other to form the upwardly and inwardly facing surface 110 of the plate 16'.

First, there is an outer upstanding flange portion 112 having a generally cylindrical configuration. Extending downwardly and inwardly from the lower edge of the flange portion 112 is an outer frustro-conical portion 114 connecting to the flange portion 112 by a transition portion 116 having in cross section a circularly curved configuration.

Figure 7:
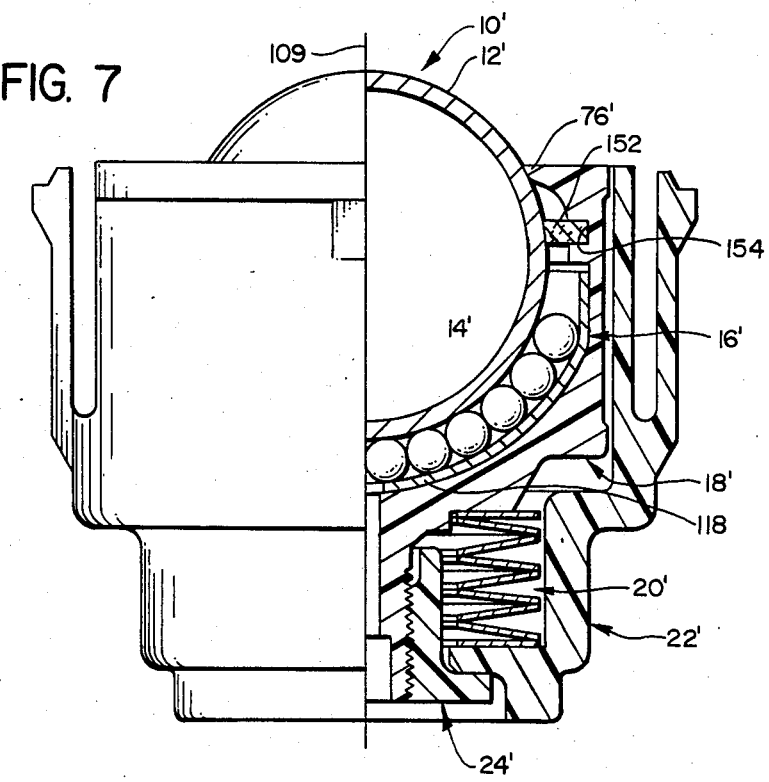
FIG. 7 is a sectional view similar to FIG. 4, the only showing one-half of the ball support assembly, and illustrating a modification of the second embodiment.

Positioned radially within the frusto-conical portion 114 and formed integrally therewith is a load bearing portion 118 which, in the section taken in FIG. 7 (which is a section taken through the axial center line 109 of the toroidal shape) is circularly curved about a center point 120. Then there is the innermost portion 122 of the bearing plate 116, and this has a frusto conical configuration, so that in the section shown in FIG. 6, this innermost portion 122 has a straight line configuration. Finally, the bearing plate 16 has a center lowermost through opening 102'.

It can be seen in FIG. 6 that the load bearing portion 118 begins at an arcuate distance from the center axis 109 (indicated at "a") which in this preferred embodiment is 12.5°. The arc defined by this load bearing portion 118 continues from the arc at "a" through an arcuate distance (indicated at "b") from the center axis 109, which in this preferred embodiment is 28.5°. It can be seen that the radial distance from the center point 120 of the bearing plate portion 114 and 122 increases as one proceeds further away from the load bearing portions 118. Thus, the ball bearings 14 which are located at the surface of the bearing portion 118 are in load bearing relationship with the main ball member 12. On the other hand, the ball bearings 14 that are positioned immediately adjacent to the innermost bearing plate portion 122 and adjacent to the outer portion 114 are not in load bearing relationship.

It has been found that this particular arrangement of the bearing plate 16' permits better circulation of the ball bearings 14', thus alleviating uneven wear which might otherwise occur. A further benefit is that this provides for a more free rotation and interchange of the ball bearings from the load bearing to the non-load bearing areas, and this has a greater tendency to move debris which might collect on the surface 110 downwardly toward the opening 102'. Since the innermost bearing plate portion 122 permits free circulation of the ball bearing 14 in the center area, these ball bearings 14 are free to move into and out of a position immediately above the hole 102'.

The mounting member 18' has an overall configuration rather similar to the mounting member 18 of the first embodiment. However, instead of being formed as a single integral member, the mounting member 18' is divided into two separate, substantially identical half sections by dividing the member 18' along a vertical plane passing through the vertical center axis 109. As in the prior embodiment of the mounting member 18, the mounting member 18' of this second embodiment can be considered as having an upper ball retaining portion 64' fitting in an upper chamber 64'a defined by the upper portion of the base member 22'. The mounting member 18' also has a lower connecting portion 66' which is configured rather differently than the connecting portion 66 of the first embodiment.

More specifically, the connection portion 66' of the second embodiment comprises (with the two sections 18'a and 18'b being located against one another in an assembled position) a cylindrically shaped exteriorly threaded stud 124 which is essentially formed by two half sections 124a and 124b. These two half sections 124a and 124b are formed with a center through opening 102", which is vertically aligned with the opening 102' and the bearing plate 16'.

The locking member 24', instead of being formed as a plug 24 as in the first embodiment, is made as an interiorly threaded retaining member 126. Thus, in the assembled position, the retaining member 126 is threaded onto the two stud portions 124a and 124b to perform two functions. First, the retaining member 126 hold the two half sections 18'a and 18'b together so that these function as a substantially unitary member. Second, the retaining member 126 has an outwardly extending peripheral horizontal flange 128 which serves the same locking function as the locking foot 90 of the first embodiment.

Also, as in the first embodiment, there is an upper circumferential lip 76' which not only functions to retain the ball member 12', but also has a cleaning or wiping action as the surface of the main ball member 12 moves past an engagement with the lip 76'.

Also, the sidewall 67' has a slightly different configuration than the corresponding sidewall 67 of the first embodiment. More specifically, there is a circular downwardly facing shoulder 130 formed in the inner surface of the wall 67' to fit over the upper circumferential edge 132 of the bearing plate 16'. Further, the circumferential outer surface of the wall 67' is moderately recessed at 134 around the circumference so as to have upper and lower circumferential contact portions 136 and 138, respectively.

The base member 22' of this second embodiment has the same general configuration as the corresponding base member 22 of the first embodiment, with the main difference being that there are not, as in the first embodiment, the separate spring-like retaining elements 52. Rather, there are two retaining arms 140 formed integrally with the base member 22' at diametrically opposed locations on the base section 22'. More specifically, each retaining arm 140 is vertically aligned and has a lower root portion 142 by which it is joined integrally to the base member 22'. The arm 140 is spaced moderately outwardly from the adjacent side surface 144 of the base member 22' so as to form a gap or slot 146. The upper end of each arm 140 is expanded radially outwardly to a moderate extent, and is formed with an upper outer right angle recess 148 which in the mounted position would engage the circumferential lip of the upper panel 28.

The lower inside corner 150 at each recess 148 is further indented or recessed inwardly so that a suitable "tweezer-like" tool can be used to engage these inwardly recessed portions 150 to grip the upper ends of the arms 140 to squeeze them inwardly and thus lift the total assembly 10' out of the floor 26.

To form the assembly 10', first the ball bearings 14' are placed on the bearing plate 16', and the main ball member 12' is placed on top of the ball bearings 14'. These three components 12'-16' are then placed between the two halves 18'a and 18'b which are fitted against one another. The spring assembly 20' is placed within the base member 22' and the subassembly 12'-18' is placed within the base member 22 and on top of the spring assembly 20'. Then the lower retaining member 126 is threaded onto the stud 124 (made up of the two half stud sections 124a and 124b) to perform the above-described functions (i.e., connecting the two sections 18'a and 18'b together as a unitary member, and also retaining the mounting member 18' within the assembly.

The assembly 10' is placed into the floor 26 in substantially the same manner as described in connection with the first embodiment, except that the two retaining arms 140 are sprung inwardly prior to placing the assembly 10' in the floor panel, and then released to move outwardly under the upper floor panel 28 so as to be held in the operating position. The manner in which the support assembly 10' operates in terms of supporting loads is substantially the same as in the first embodiment, so a description of the same will not be repeated with reference to the second embodiment.

A modification of this second embodiment 10' is illustrated in FIG. 7. The components of the modification shown in FIG. 7 are substantially the same as in the embodiment shown in FIGS. 4-6, except that there is added a circumferential ring 152 which fits in a circular slot 154 formed in the upper inner portion of the mounting member 18'. This ring 152 can be made of a yielding pad-like material, such as felt, and this provides, in addition to the lip 76', a wiping and cleaning function for the surface of the main support ball member 12'. Further, this felt ring 152 provides a durable and substantially friction free run of the main ball member 12'.

It is to be recognized that various modifications can be made of the present invention without departing from the basic teachings thereof.

What is claimed is:

1. A ball support assembly adapted for use as part of a cargo handling system, said assembly comprising:
   a. a base member comprising:
      1. an upper base portion having upper peripheral side wall means defining an upper chamber,
      2. a lower base portion having a lower peripheral side wall means defining a lower chamber,
      3. a bottom base portion,
   b. a mounting member means mounted within said base member for limited up and down movement between an upper normal position and a lower depressed position, said mounting member means comprising:
      1. an upper ball retaining portion positioned in said upper chamber and having side wall means and bottom wall means defining a ball receiving recess,
      2. a lower connecting portion connected to and extending downwardly from the ball retaining portion,
      3. said connecting portion having an operative connection with said bottom base portion to limit upward movement of said mounting member means beyond said upper normal position and yet to permit downward movement to said depressed position,
   c. said mounting member means and said base member having cooperating stop means to limit any downward movement of the mounting member means beyond the depressed position,
   d. a ball member rotatably mounted in said recess and positioned to provide a rotatable ball support surface,
   e. compression spring means positioned in the lower chamber of the lower base portion of the base member in a manner to press downwardly against said bottom base portion and upwardly against said mounting member means in a manner to resiliently hold the mounting member means at the upper normal position and to yieldingly resist downward movement of the mounting member means due to loads imposed on the ball support surface, f. said assembly being characterized in that an upward force exerted by said spring means against said mounting member means is, with said mounting member means in the normal position, and with no substantial downward load being exerted on the ball member, resisted at least primarily by said connecting portion reacting substantially in tension between said bottom base portion and said upper ball retaining portion of the mounting member means.

2. The assembly as recited in claim 1, wherein the connecting portion of the mounting member means comprises outwardly extending flange means positioned to engage said bottom base portion so as to limit upward movement of said mounting member means.

3. The assembly as recited in claim 2, wherein said connecting portion of the mounting member means comprises a separate connecting member which is removably connected in said mounting member means.

4. The assembly as recited in claim 3, wherein said mounting member means comprises a downwardly extending threaded stud means, and said connecting member threadedly engages said stud means.

5. The assembly as recited in claim 4, wherein said mounting member means comprises two main mounting members which are adapted to be placed in side by side relationship to provide a main mounting member portion, and said connecting member in engaging said stud means functions to secure said main mounting members one to another to fixedly secure said main mounting members to one another.

6. The assembly as recited in claim 1, wherein said mounting member means comprises first and second main mounting members which are adapted to be placed in side by side relationship to form said upper ball retaining portion and said bottom wall means, said connecting portion comprising a separate connecting member which is removably connected to said main mounting members to secure said main mounting members together.

7. The assembly as recited in claim 1, wherein said mounting member means provides an upwardly facing bearing surface, and there is ball bearing means positioned between said bearing surface and said ball member, said bearing surface comprising a first load bearing portion which is circulary curved about a center point in a manner that when a portion of said ball bearing means is positioned against said load bearing surface, that portion of the ball bearing means is in load bearing relationship with said ball member, said bearing surface comprising a non-bearing surface portion positioned radially from said center point a further distance than said load bearing surface portion, so that when a second portion of said ball bearing means is adjacent said non-bearing surface, that second portion of the ball bearing means is not in load bearing relationship.

8. The assembly as recited in claim 7, wherein said non-bearing surface portion comprises an annular surface portion positioned radially outwardly of said load bearing surface portion.

9. The assembly as recited in claim 8, wherein there is a second non-load bearing surface portion centrally located within said load bearing surface portion.

10. The assembly as recited in claim 9, wherein said mounting member means is provided with a downwardly extending through opening leading from a central location of said mounting member means to permit material to pass from said ball receiving recess through said downardly extending opening.

11. The assembly as recited in claim 9, wherein:
a. said expandable side wall is formed with vertically extending slot means, and said expandable side wall is formed with upper retaining lip means which reach inwardly to retain said ball member;
b. said connecting portion comprises a plurality of downwardly extending leg members having lower locking means, said assembly further comprising a locking member to hold the legs outwardly in locking engagement in the bottom opening of the lower portion of the base member;
c. said connecting portion has a lower end portion in locking engagement with the lower portion of the base member, said spring means is positioned around said connecting portion so as to press from the lower portion of the base member upwardly against the mounting member, said mounting member having a downwardly facing annular surface positioned outwardly of said connecting portion, and said base member having a matching upwardly facing, generally annular surface to come into contact with the downwardly facing surface of the annular portion of the mounting member, with said two generally annular surfaces providing the cooperating stop means to limit downward movement of the mounting member.

12. The assembly as recited in claim 7, wherein said mounting member means comprises a bearing plate mounted within said mounting member and providing said bearing surface.

13. The assembly as recited in claim 1, wherein said assembly is adapted to be positioned in a floor member, and said base member is provided with arm retaining means, which project yieldingly outwardly to engage a lower retaining surface of said floor member.

14. The assembly as recited in claim 13, wherein said arm means comprises a pair of diametrically opposed arm members positioned on opposite sides of said base member, and said arm members can be deflected inwardly to a release position, with said arm members being yieldingly urged to a radially outwardly extending floor engaging position.

15. The assembly as recited in claim 14, wherein said arm members are made integrally with said base member, and have lower root ends thereof integrally connected to said base member, and upper free ends which engage said floor member.

16. The assembly as recited in claim 15, wherein the upper portions of said arm member are formed with notch means to receive a locating tool adapted to engage said notch means in a manner to push said arm members inwardly to a release position.

17. The assembly as recited in claim 1, wherein said cooperating stop means comprises a first annular shoulder means presenting a downwardly facing annular stop surface positioned adjacent an outer peripheral wall of said mounting member means, and a second shoulder means formed in said base member and presenting an outer annular upwardly facing stop surface adjacent a peripheral portion of said base member.

18. The assembly as recited in claim 1, wherein said ball retaining portion comprises a unitary member which in turn comprises an expandable side wall which has an expanded position of sufficient size to receive the ball member in the recess and a retracted position where the ball member is held in the recess.

19. The assembly as recited in claim 18, wherein the peripheral wall of the base member fits sufficiently closely around the expandable side wall of the ball retaining portion so as to maintain the expandable side wall in its retracted position to retain the ball in the recess.

20. The assembly as recited in claim 19, wherein said expandable side wall is formed with vertically extending slot means, and said expandable side wall is formed with upper retaining lip means which reach inwardly to retain said ball member.

21. The assembly as recited in claim 1, wherein said connecting portion is positioned to fit into a bottom opening in the lower portion of the base member so as to be in locking engagement with the base member.

22. The assembly as recited in claim 21, wherein said connecting portion comprises a plurality of downwardly extending leg members having lower locking means, said assembly further comprising a locking member to hold the legs outwardly in locking engagement in the bottom opening of the lower portion of the base member.

23. The assembly as recited in claim 1, wherein said spring means comprises a plurality of frusto-conical spring members positioned around said connecting portion and pressing from a bottom wall of said base member upwardly against said mounting member means.

24. The assembly as recited in claim 1, wherein said connecting portion has a lower end portion in locking engagement with the lower portion of the base member, said spring means is positioned around said connecting portion so as to press from the lower portion of the base member upwardly against the mounting member, said mounting member having a downwardly facing annular surface positioned outwardly of said connecting portion, and said base member having a matching upwardly facing, generally annular surface to come into contact with the downwardly facing surface of the annular portion of the mounting member, with said two generally annular surfaces providing the cooperating stop means to limit downward movement of the mounting member.

25. The assembly as recited in claim 1 wherein:
   a. said ball retaining portion comprises an expandable side wall which has an expanded position of sufficient size to receive the ball in the recess and a retracted position where the ball is held in the recess;
   b. the peripheral wall of the base member fits sufficiently closely around the expandable side wall of the ball retaining portion so as to maintain the expandable side wall in its retracted position to retain the ball in the recess;
   c. said connecting portion is positioned to fit into a bottom opening in the lower portion of the base member so as to be in locking engagement with the base member.

* * * * *